United States Patent [19]

Coleman

[11] Patent Number: 4,528,200
[45] Date of Patent: Jul. 9, 1985

[54] MINERALIZED BREWED BEVERAGES

[75] Inventor: Henry E. Coleman, Salt Lake City, Utah

[73] Assignee: Spring Water Brew International, Salt Lake City, Utah

[21] Appl. No.: 485,201

[22] Filed: Apr. 15, 1983

[51] Int. Cl.$^3$ ............................ A23F 5/00; A23L 1/30
[52] U.S. Cl. ......................................... 426/74; 426/78; 426/250; 426/595; 426/433; 426/658
[58] Field of Search ...................... 426/74, 78, 84, 250, 426/594, 595, 597, 423, 427, 433, 435

[56] References Cited

U.S. PATENT DOCUMENTS

| | | | |
|---|---|---|---|
| 2,118,184 | 5/1938 | Fronmuller et al. | 426/594 |
| 2,375,550 | 5/1945 | Grossman | 426/423 |
| 2,926,088 | 2/1960 | Spiselman | 426/594 |
| 4,006,263 | 2/1977 | Klug et al. | 426/74 |
| 4,229,481 | 10/1980 | Fornari | 426/433 |

FOREIGN PATENT DOCUMENTS

| | | | |
|---|---|---|---|
| 0480498 | 5/1937 | Fed. Rep. of Germany | 426/78 |
| 2731917 | 2/1979 | Fed. Rep. of Germany | 426/84 |

*Primary Examiner*—Raymond Jones
*Assistant Examiner*—Marianne S. Minnick
*Attorney, Agent, or Firm*—Thorpe, North & Western

[57] ABSTRACT

A composition and method for mineralizing and enhancing the flavor of brewed beverages such as coffee and tea is disclosed wherein a finely divided mineral, a coloring agent such as powdered caramel, and a particulate beverage base such as ground coffee are combined to form an admixture. The admixture is placed on a filter and hot water is added. A portion of the finely divided mineral is dissolved in the hot water and passes through the filter along with the water soluble beverage ingredients. A small amount of the mineral solids also pass through the filter into the brewed beverage. A major portion of the mineral solids are retained on the filter surface, thereby retarding the brewing process and enhancing the extraction of flavoring ingredients from the particulate beverage base. The minerals added during the brewing process approximate those formed in fresh spring water and enhance the flavor of the brewed beverage.

14 Claims, No Drawings

MINERALIZED BREWED BEVERAGES

This invention relates to a composition and method for the mineralization of brewed beverages. More particularly, this invention relates to a composition and method of mineralizing brewed beverages for flavor enhancement during the brewing process.

BACKGROUND OF THE INVENTION

The flavor of brewed beverages such as coffee and tea has long been a selling point of those who market these drinks. Both coffee and tea are complex substances containing numerous ingredients. Coffee, for example, has over 300 identified ingredients. A chief ingredient is a stimulant in the form of caffeine and tannic acid. Various aromatic oils, nitrogeneous substances, dextrins, gums and other substances supply flavor. Caffeine and flavors are extracted when ground roasted coffee beans or dried tea leaves are brewed with hot water.

Just how much flavor is extracted from ground coffee or tea leaves is a function of time, water amount and temperature, surface area and solubility. The quality of the brewing water and kind and grade of coffee or tea are also important.

When brewing coffee, the ground coffee is generally placed in a filter and hot water is added and allowed to percolate through the filter along with the dissolved coffee solids. The lightening of the color of the water coming through the filter is often taken as an indication of when all the flavor has been extracted. However, this is not the case and many flavoring agents are thrown away with spent coffee grounds. These flavoring agents of coffee are colorless or of less intense color when extracted during a brewing process. Since the public has come to expect a certain color from brewed coffee, these lighter colored and more difficulty extracted materials are not utilized.

The caffeine, acids and darker oils are extracted first during the brewing process and contribute to the bitterness or strong flavor which develops in brewed coffee upon standing for a period of time. If all the flavor ingredients were to be extracted from the brewing process, one could obtain better flavor, less bitterness and caffeine per unit of ground coffee, but at some sacrifice to the deep rich coffee color. It has been proposed that this probelm could be overcome by adding a coloring agent such as caramel powder to the ground coffee to provide color. This may work to a point, but there are other matters to be considered.

It has been said that there are three factors which need to be considered in brewing premium coffee, i.e., the grade or blend of coffee, the brewing process and the quality of water.

It has long been known that soft water is less palatable than spring or mountain water for drinking purposes. Mineral waters from special springs are shipped all over the world because of their taste and, in some cases, alleged medicinal properties. Most mineral waters contain calcium, magnesium and iron along with other ingredients including sodium, potassium, silicon, boron, fluorine and many other trace ingredients. These waters are so varied in solids content that, except for the above mentioned minerals, they are impossible to categorize.

In most cases, these mineral waters are formed by rain water seeping underground through inorganic materials such as rock and sand dissolving mineral matter along the way. Other springs rise deep from the earth, are often hot and contain gaseous materials such as sulfur. Most of the calcium magnesium, iron and other multiply charged cations in spring water are present with bicarbonates, sulfates or similar anions.

When spring water is heated for brewing coffee, many of the minerals are lost. Bicarbonates, for example, release carbon dioxide upon heating and precipitate as insoluble carbonates. Some mineral sulfates, such as calcium sulfates, are somewhat less soluble in hot water than in cold. Sulfates of transition metals, such as irons, may be oxidized when heated with the metal going from the ferrous to the ferric state, the sulfate ion being converted to a sulfur oxide which combines with water to form sulfuric acid. The ferric ion combined with oxygen to form the insoluble ferric oxide $Fe_2O_3 \cdot H_2O$.

Due to the demineralization of water upon heating many of the desirable taste properties found in spring water are lost during the brewing process. Also, the softening of water wherein the calcium and magnesium ions are replaced with sodium makes water less palatable and flat tasting.

OBJECTS AND SUMMARY OF THE INVENTION

It is, therefore, an object of the present invention to provide a process and composition for the mineralization of brewed beverages during the brewing process.

It is also an object of the invention to provide a process and composition which not only provides for the mineralization of brewed beverages, but also provides for the maximum flavor extraction from the minimum amount of beverage base being brewed.

These and other objects may be accomplished by admixing a particular form of the beverage base to be brewed with a minor amount of a finely divided mineral source consisting of a hydrated aluminum silicate base also containing minor amounts of other minerals selected from the group consisting of calcium, magnesium and iron, and mixtures thereof in a naturally occurring form. This mixture is placed in a filter medium, such as on a coffee filter or in a tea bag, and then treated with hot water as in a conventional brewing process.

The finely divided mineral source is first thoroughly mixed with a beverage base such as ground coffee. A measured amount is placed on a filter medium as in the regular brewing process, and hot water is added.

Normally, the brewing water is retained by the filter only long enough to extract the more water-soluble coffee solids. In the present invention, the brewing water extracts the more soluble coffee solids and the water soluble mineral salts contained in the mineral source. Also, a minor portion of the mineral source has a particle size sufficiently small that such mineral particles pass through the filter along with the dissolved coffee and mineral solids. A major portion of the finely divided mineral is retained on the surface of the filter and retards the rate of flow through the filter. This allows greater extraction of flavor from the ground coffee and, therefore, smaller amounts of coffee can be used to obtain the same flavor normally found in using larger amounts. In addition, the minerals added to the brewed coffee significantly enhance the flavor.

Since smaller amounts of coffee may be used to obtain the same flavor with approximately the same coffee solids content, the color of the brewed coffee may be lighter. It may, therefore, be desirable to add a coloring agent such as caramel powder to the mixture of ground coffee and finely divided mineral source.

In addition, other flow-reducing agents such as modified starches may be added to the ground coffee, mineral source blend. Modified starch is water insoluble, but swells in the presence of hot water to form a matrix on top of the filter and retarding the flow rate of brewed beverage through the filter.

The invention, as summarized above, will now be described in detail.

DETAILED DESCRIPTION OF THE INVENTION

Since brewed beverages have little caloric value, except when used with additives such as cream, milk and sugar, they are consumed primarily for taste or medicinal effects. Quality blends of coffee or tea are more costly than cheaper, more abundant blends.

Without resorting to additives which affect flavor, such as cream and sugar, there are basically two ways to obtain maximum flavor quality. The first is to extract as much quality flavor from a beverage base as is possible and the second is to have a quality water in the brewed beverage. The present invention is drawn to both facets and accomplishes both through a unique brewing process.

As already mentioned, the primary cations found in quality spring water are usually calcium, magnesium and iron. The anions associated with these metal cations are usually bicarbonate and sulfate. However, oxides, carbonates, phosphates, chlorides and other anions may also be present. Other minerals in trace form such as boron, fluorine, barium, copper, cobalt, zinc, nickel, aluminum, manganese, silver and many others may also be present. Some, which are insoluble, are present in extremely finely divided particulate form as colloids. Water treatment plants often remove many of the minerals that improve water flavor when removing undesirable bacteria, waste and other foreign materials. Ion exchange resins used in water treatment to soften water add excessive amounts of sodium and potassium to water. Also, heating water to boiling or near boiling removes many more minerals as well as desirable gases such as air.

The key feature of the present invention is a method to replace as many of the desirable minerals as possible to the water of a brewed beverage. It has now been found that many naturally occurring minerals, such as some clays, contain the appropriate minerals and can be utilized to mineralize hot waters if added to such waters under appropriate conditions, and after such hot waters have begun their cooling process.

Clay is defined as a hydrated aluminum silicate which may also contain other minerals. There are myriad kinds and qualities of clays which vary greatly in chemical composition and particle size. There may also be other mineral combinations of alumina and silica such as finely divided igneous rocks, shale, sandstone and sedimentary deposits which could also be used, provided they have the appropriate chemical makeup.

For purposes of the present invention, both chemical makeup of the mineral and particle size are important. Besides being primarily composed of an aluminum silicate, it is important that the mineral source contain calcium, magnesium and iron. Since the eight most prevalent elements in the earth's crust are, in order, oxygen, silicon, aluminum, iron, calcium, sodium, potassium and magnesium, it would seen that the chemical makeup requirement could be easily satisfied. The following table taken from Pettijohn, *Sedimentary Rocks*, Harper Brothers (1948), as contained on page 3126 of the *Handbook of Chemistry and Physics*, 39th Edition, verifies that many materials satisfy these criteria.

| CHEMICAL COMPOSITION OF ROCKS | | | | | |
|---|---|---|---|---|---|
| Element | Average igneous rock | Average shale | Average sandstone | Average limestone | Average sediment |
| $SiO_2$ | 59.14 | 58.10 | 78.33 | 5.19 | 57.95 |
| $TiO_2$ | 1.05 | 0.65 | 0.25 | 0.06 | 0.57 |
| $Al_2O_3$ | 15.34 | 15.40 | 4.77 | 0.81 | 13.39 |
| $Fe_2O_2$ | 3.08 | 4.02 | 1.07 | 0.54 | 3.47 |
| FeO | 3.80 | 2.45 | 0.30 | | 2.08 |
| MgO | 3.49 | 2.44 | 1.16 | 7.89 | 2.65 |
| CaO | 5.08 | 3.11 | 5.50 | 42.57 | 5.89 |
| $Na_2O$ | 3.84 | 1.30 | 0.45 | 0.05 | 1.13 |
| $K_2O$ | 3.13 | 3.24 | 1.31 | 0.33 | 2.86 |
| $H_2O$ | 1.15 | 5.00 | 1.63 | 0.77 | 3.23 |
| $P_2O_5$ | 0.30 | 0.17 | 0.08 | 0.04 | 0.13 |
| $CO_2$ | 0.10 | 2.63 | 5.03 | 41.54 | 5.38 |
| $SO_3$ | | 0.64 | 0.07 | 0.05 | 0.54 |
| BaO | 0.06 | 0.05 | 0.05 | | |
| C | | 0.80 | | | 0.66 |
| | 99.56 | 100.00 | 100.00 | 99.84 | 99.93 |

From the above, it is seen that only limestone does not meet the stated criteria. However, since limestone contains calcium, magnesium and iron, some or all of the mineral source may consist of finely divided limestone if needed to meet taste requirements of the brewed beverage. Therefore, limestone is considered to be within the scope of the invention.

That is not to say that any mineral base containing the above stated minerals may be used. The presence of toxic materials and degree of solubility of minerals must also be considered. Because of the variety of materials available, it is not possible to categorize an acceptable mineral source by name, i.e., clay, sandstone, shale, limestone, etc. Rather, each source will generally be determined on an empirical basis. Most mineral sources utilized, except for limestone, will have, at the minimum, the following composition calculated as oxide:

| REQUIRED MINERAL COMPOSITION (% by weight) | | |
|---|---|---|
| | Minimum | Maximum |
| $SiO_2$ | 55 | 80 |
| $Al_2O_3$ | 4 | 16 |
| $Fe_2O_3$ | 1.5 | 7 |
| MgO | .5 | 3.5 |
| CaO | 1.5 | 8 |

As previously stated, other non-toxic minerals may also be present. By non-toxic is meant that the mineral concentration and solubility is not sufficient to be present in toxic amounts in the brewed beverage. Many mineral sources contain trace amounts of many minerals in insignificant amounts which are perfectly safe.

The mineral particles must be ground to a fine particle size. By fine particle size is meant that at least 90% of the particle will be less than 1.0 mm in diameter and preferably at least 75% will be less than 0.5 mm in size. It is especially preferred that at least 50% of the particles be 0.2 mm or less in size.

The mineral source is preferably prepared by dry grinding to the above size at an elevated temperature of between about 200° to 300° F. to remove as much water as possible from the finely divided mineral. This facilitates the preparation of a homogeneous blend of ground coffee with the mineral source.

The appropriate ratio of mineral source to particulate beverage base will vary greatly depending upon many factors such as mineral composition, solubility and particle size. In general, the ratio will vary from about 1 to 25 grams of finely divided mineral source for every pound of beverage base used. Preferably, the amount of mineral will vary from about 2 to 10 grams of mineral source per pound of beverage base, or stated differently, the mineral to beverage ratio may vary from 1:450 to 1:18, with ratios of 1:225 to 1:45 being preferred. Larger amounts of mineral may be used with increased mineral particle size.

The mineral source and beverage base may be pre-blended, or the finely divided mineral source may be added to the beverage base at the time of brewing. If added just prior to brewing, the mineral should be as thoroughly admixed with the beverage particles as possible. For example, the desired amount of mineral source and one pound of ground coffee could be added to a paper bag. The bag is then closed and vigorously shaken to affect the mixture. Commercial blending equipment may also be used.

It has been found that, in addition to mineralizing the brew water, the use of finely divided minerals slows the brewing process and, in the case of coffee, one may obtain the same coffee flavor with about one half the amount of ground coffee previously used. Since less ground coffee is used, the brewed coffee will contain less caffeine and acids, and also less bitter taste. It will also remain fresh longer. The mineral particles retard the brewing process by settling into the interstices of the coffee filter or tea bags.

Since some minerals dissolve and some of the finer particles pass through the interstices of the filter, it may also be desirable to utilize other flow retardants. Any inert filter retardant type of material may be used. Typical materials include particulate cellulosic or starch materials which are insoluble, but swell in water and which will not pass through the filter. Inorganic materials such as silica gel, may also be used. However, ion exchange materials, such as zeolites and ion exchange resins, should be avoided since they exchange the desired calcium and magnesium ions with sodium or potassium before passing through the filter matrix. The amount of flow retardant to be used will be strictly a matter of the results desired. Too much flow retardant will plug the filter or increase the brewing time beyond that required to extract the desired flavor components. Generally, anywhere from 0 to 40 grams of flow retardant per pound of ground coffee or tea base may be used.

Since more flavor is produced with less beverage base, the color of the brewed beverage may be lighter than is acceptable to consumers. This is due to the fact that many of the flavors extracted from the beverage base by the extending brewing time are colorless. Therefore, it may be advantageous to add any non-toxic FDA approved coloring material to the mixture of beverage base and mineral source. Because caramel powder is commonly used for producing coffee of deep brown colors, it is a preferred coloring agent. The amount to use will be strictly a matter of color to be imparted to the brewed beverage. Generally speaking, the amount of caramel powder may vary between about 0 to 100 grams per pound of beverage base.

If desired, the finely divided mineral source, flow retardant and coloring agent may be made into a homogeneous mixture and prepackaged for admixture with a beverage base just prior to brewing. Such a composition may contain from 1 to 25 parts by weight of a finely divided mineral having a composition and particle size as defined above, 1 to 40 parts by weight of a flow retardant as previously described, and 1 to 100 parts by weight of a colorizing agent. Particularly, preferred are admixtures wherein the ratio of flow retardant to mineral source are 0.25:1 to 1:1, and where the ratio of caramel powder to mineral source are 1:1 to 4:1. During mixing of the mineral source, flow retardant and coloring agent, it may also be desirable to add a minor amount of an edible oil, such as coconut oil, to the mixture to inhibit the formation of dust particles. This will normally not amount to more than 0.5 percent of the total composition.

The brewing is accomplished by placing the mixture of beverage base and finely divided mineral source, with or without flow retardants or coloring agents, on a filter or in a filter bag, and subjecting the mixture to an appropriate amount of hot water. Brewing temperatures normally vary between the boiling temperature of water down to about 150° F. The boiling temperature will vary according to altitude from about 212° to 200° F. Preferably, however, the water used for brewing will reach its peak temperature before coming in contact with the beverage base-mineral mixture and actually be cooling down. Brewing temperatures in the range of 170° to 150° F. are preferred for optimum flavor extraction and mineralization.

In order to demonstrate the operability of the present invention, the following data is presented.

EXAMPLE I

Two types of clays were ground to a size as to be operable in the present invention. The chemical analysis of the clays and their particle size distribution are reported in the following tables:

| | COMPOSITION % by total as oxides | |
|---|---|---|
| Element | Mineral A | Mineral B |
| $SiO_2$ | 66.92 | 63.65 |
| $Al_2O_3$ | 14.05 | 15.65 |
| CaO | 1.94 | 7.52 |
| MgO | 0.68 | 1.15 |
| $Na_2O$ | 2.69 | 1.81 |
| $K_2O$ | 2.67 | 1.65 |
| $Fe_2O_3$ | 1.67 | 1.59 |
| BaO | 0.03 | 0.03 |
| $SO_3$ | 0.05 | 0.04 |
| $N_2O_5$ | 1.69 | 0.72 |
| Other | 7.61 | 6.19 |
| | 100.00 | 100.00 |

| | PARTICLE SIZE DISTRIBUTION % in each range | |
|---|---|---|
| Microns | Mineral A | Mineral B |
| 3360+ | 0.0 | 0.0 |
| 1000–3360 | 3.7 | 1.2 |
| 500–1000 | 22.9 | 4.3 |
| 297–500 | 11.3 | 5.0 |
| 125–297 | 28.0 | 28.8 |
| 105–125 | 8.9 | 7.0 |
| 74–105 | 10.0 | 18.5 |
| 74– | 15.2 | 35.2 |

-continued

| PARTICLE SIZE DISTRIBUTION % in each range | | |
|---|---|---|
| Microns | Mineral A | Mineral B |
|  | 100.00 | 100.00 |

EXAMPLE II

A mineralizer premix was made by dryblending 100 pounds of caramel powder, 32 pounds of Mineral B from Example I and 8 pounds of a modified corn starch to a uniform blend. About 0.5 pounds of coconut oil was added to reduce dust formation during the blending process.

EXAMPLE III

This example illustrates the effectiveness of the mineralizer premix in increasing the mineral content of tap water. Tap water containing 148 milligrams per liter (mg/l) of dissolved mineral solids was heated to about 160° F. About 1.2 grams of the mineralizer mixture of Example I was placed in a coffee filter and seventy-two fluid ounces of the heated tap water was allowed to precolate through the filter. The resulting water was caramel colored and had a solids content of 692 mg/l. Since the tap water contained 149 mg/l, it is evident that at least 544 mg/l was provided by the caramel and mineral content of the mineralizer mix. The dissolved caramel solids accounted for 461 mg/l and the dissolved mineral solids added by the mineralizer mix was calculated to be 83 mg/l.

EXAMPLE IV

To show the efficiency of the present invention in mineralizing a brewed coffee, and also in extracting more dissolved coffee flavor per unit of ground coffee, three different samples of brewed coffee were prepared in accordance with the following table. The same ground coffee was used in each sample, and the same volume of water was used to prepare each sample.

|  | COFFEE SAMPLE | | |
|---|---|---|---|
|  | C | D | E |
| Ground Coffee (amount) | ⅔ cup | ⅓ cup | ⅓ cup |
| Mineralizer Blend (Example 2) | 0 | 1.2 grams | 0 |
| Tap Water (148 mg/l dissolved solids) | 53 fl oz | 53 fl oz | 53 fl oz |
| Initial Brewing Temperature | 160° F. | 160° F. | 160° F. |
| Dissolved Coffee Solids (mg/l) | 5112 | 4308 | 2484 |
| Dissolved Mineral Solids (mg/l) | 148 | 274 | 148 |
| Dissolved Caramel Solids (mg/l) | 0 | 439 | 0 |
| Color | Dark Brown | Dark Brown | Light Brown |
| Taste | strong-flat | full-mellow-crisp | weak-watery-unpalatable |
| Taste After Standing 4 hours | bitter-flat-unpalatable | slightly bitter-crisp-still palatable | weak-watery-unpalatable |

The above results show the effective extraction of coffee solids as a result of the present invention. Only one half the amount of coffee was used for Sample D as in Sample C, but the dissolved coffee solids of Sample D were 84.27% of those in Sample C. Stated differently, the flavor extraction from Sample D was 1.69 times greater than in Sample C. At the same time, the mineralization of Sample D was greater than in either Samples C or E and the flavor of the coffee was described as "crisp" rather than "flat".

Similar results may be obtained with tea or other beverage gases. Obviously, the amounts of beverage base used may be adjusted according to one's taste. Therefore, the invention is not to be limited to the disclosed embodiments, but is to be accorded the full scope of the appended claims.

What is claimed is:

1. A method of producing a mineralized brewed coffee which comprises the steps of
   (a) intimately admixing a particulate coffee with a composition comprising 1 to 25 parts by weight of a finely divided mineral source consisting of a naturally occurring hydrated aluminum silicate containing minerals selected from the group consisting of calcium, magnesium and iron and mixtures thereof, 1 to 40 parts by weight of a particulate water insoluble, water swellable flow retarding agent and 1 to 100 parts by weight of a particulate non-toxic coloring agent wherein the weight ratio of coffee to mineral source is between about 450:1 to 18:1, to form a particulate mixture;
   (b) confining a predetermined amount of said particulate mixture by a filter medium through which said particulate coffee, particulate flow retarding agent and a majority of said finely divided mineral source cannot pass in solid form;
   (c) subjecting said predetermined amount of said particulate mixture confined by said filter medium to a predetermined amount of hot water for a period of time sufficient to (1) cause said flow retarding agent particles in said mixture to swell and retard the flow of hot water through said mixture, (2) to extract into said hot water the desired hot water soluble components from said coffee and (3) to dissolve in said hot water said coloring agent and the hot water soluble mineral components from said mineral source; and
   (d) passing said hot water containing said soluble coffee components and dissolved coloring agent and soluble mineral components through said filter medium along with a minimum amount of solids from said mineral source which are sufficiently small to pass through said filter medium at a rate permited by said water swelled flow retarding agent particles and finely divided mineral source to form a hot, mineralized brewed coffee beverage.

2. A method according to claim 1 wherein the ratio of coffee to mineral source is about 225:1 to 45:1.

3. A method according to claim 1 wherein at least 90% of said finely divided mineral source is smaller than 1.0 mm in size.

4. A method according to claim 3 wherein at least 75% of said finely divided mineral source is smaller than 0.5 mm in size.

5. A method according to claim 4 wherein at least 50% of said finely divided mineral source is smaller than 0.2 mm in size.

6. A method according to claim 5 wherein the hot brewing water is maintained at a temperature between about 150° and 212° F.

7. A method according to claim 6 wherein said coloring agent is powdered caramel.

8. A method according to claim 7 wherein the ratio of powdered caramel to finely divided mineral is about 1:1 to 4:1.

9. A method according to claim 8 wherein the ratio of flow retarding agent to finely divided mineral source is about 0.25:1 to 1:1.

10. A method according to claim 9 wherein the flow retarding agent is a modified starch.

11. A composition for enhancing the flavor and color of hot brewed coffee comprising an intimately admixed particulate mixture consisting of 1 to 25 parts by weight of a finely divided mineral source consisting of a naturally occurring hydrated aluminum silicate containing minerals selected from the group consisting of calcium, magnesium and iron and mixtures thereof, 1 to 40 parts by weight of a particulate water insoluble, water swellable flow retarding agent and 1 to 100 parts by weight of a particulate non-toxic coloring agent.

12. A composition according to claim 11 wherein the coloring agent is powdered caramel.

13. A composition according to claim 12 wherein the flow retardant is a modified starch.

14. A composition according to claim 13 wherein the weight ratio of powdered caramel to finely divided mineral source is between about 1:1 and 4:1 and wherein the weight ratio of modified starch to finely divided mineral solids is between about 0.25:1 and 1:1.

* * * * *